Figure 1:
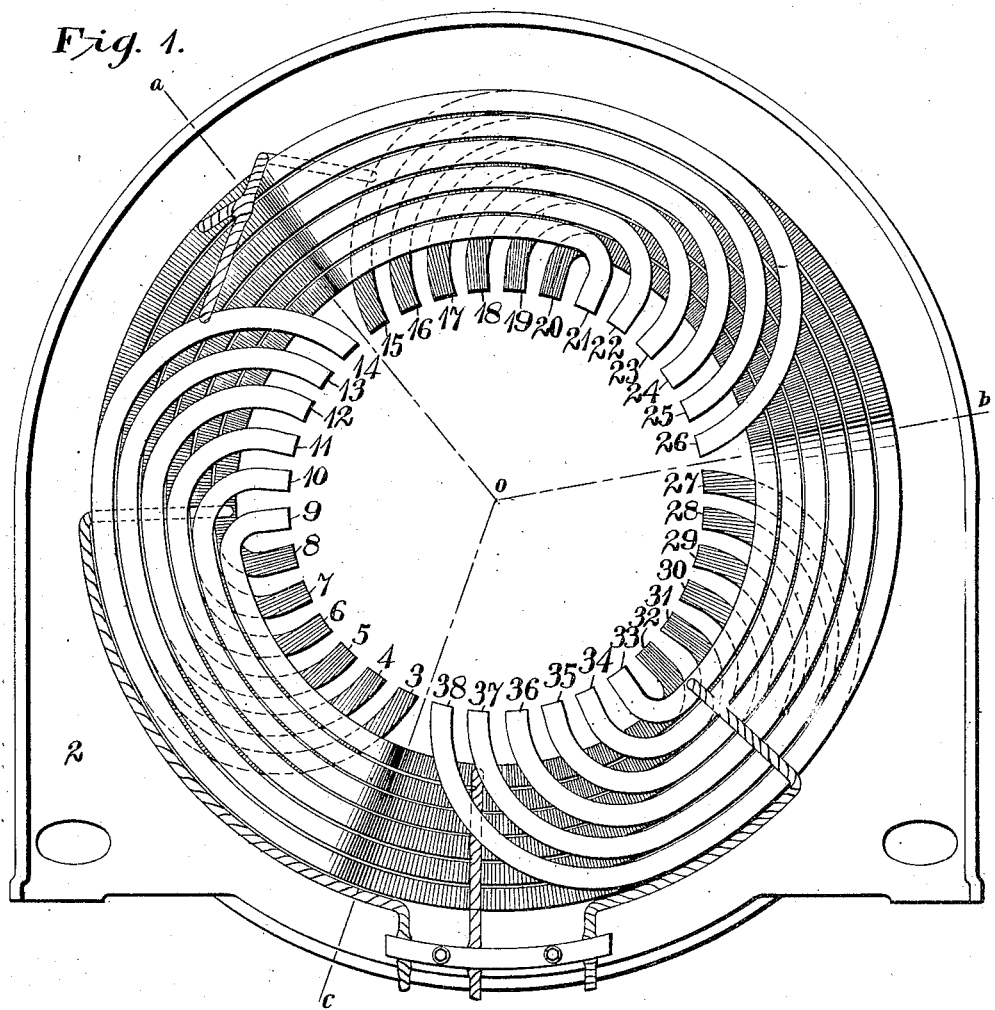

G. R. MAXWELL.
WINDING FOR DYNAMO ELECTRIC MACHINES.
APPLICATION FILED JUNE 16, 1905. RENEWED APR. 10, 1908.

905,900.

Patented Dec. 8, 1908.

WITNESSES:
Fred. H. Miller
R. J. Dearborn

INVENTOR
George R. Maxwell
BY
Wesley G. Carr
ATTORNEY

UNITED STATES PATENT OFFICE.

GEORGE R. MAXWELL, OF PITTSBURG, PENNSYLVANIA, ASSIGNOR TO WESTINGHOUSE ELECTRIC & MANUFACTURING COMPANY, A CORPORATION OF PENNSYLVANIA.

WINDING FOR DYNAMO-ELECTRIC MACHINES.

No. 905,900.          Specification of Letters Patent.         Patented Dec. 8, 1908.

Application filed June 16, 1905, Serial No. 265,595. Renewed April 10, 1908. Serial No. 426,317.

*To all whom it may concern:*

Be it known that I, GEORGE R. MAXWELL, a citizen of the United States, and a resident of Pittsburg, in the county of Allegheny and State of Pennsylvania, have invented a new and useful Improvement in Windings for Dynamo-Electric Machines, of which the following is a specification.

My invention relates to windings for dynamo-electric machines, and particularly to the end connections of such armature windings as are adapted for use with polyphase generators of relatively large capacity and high speed that comprise revolving field magnets having a relatively small number of poles.

The object of my invention is to provide end connections for armature windings of polyphase generators that shall be of rigid construction; that shall maintain an equality in the amount of copper in the windings corresponding to the several phases and that shall permit the removal of a coil for repairs from any one slot with minimum expenditure of labor and with a minimum disturbance of the winding.

Windings which have been used in the prior art in the manufacture of turbo-generators and similar high speed electrical machines were usually composed of coils having a large number of conductors, the conductors in any one slot being connected at both ends with the conductors in another slot removed therefrom by a considerable number of intervening slots by reason of the small number of poles, so that the end connections involved a great number of connections and comprised long, heavy groups of conductors. Each side of each coil usually extended a short distance in a substantially straight line beyond the ends of the slot, then a short distance radially away from the axis of the core, and then in a curve which merged into one of large radius that was substantially concentric with the inner surface of the core and parallel to its end surface. The winding was divided into groups and alternate groups were curved in opposite directions from radial lines. Adjacent groups which extended away from each other were in the same plane parallel to the end of the core, and adjacent groups which crossed each other were in different parallel planes. With this form of winding, the copper in the several faces was materially unbalanced in weight and the coils in many of the slots could not be taken out for repairing a ground or similar damage without a material disturbance of the winding. To obviate these difficulties, the end connections of each coil in the winding of my invention are located partially in two planes, one portion being parallel and near to the end of the core while the other portion is in a parallel plane to the first but outside a portion similar to the first on a next adjacent group, so that, passing around the core from one group to the next in one direction, each group overlaps a portion of the succeeding adjacent group. A further advantage of this arrangement lies in the fact that the bending which is necessarily involved in passing from one plane to another serves to stiffen the end connections, rendering them less liable to become distorted for any reason, such as a short-circuit on the winding.

My invention is illustrated in the accompanying drawing, in which—

Figure 2:
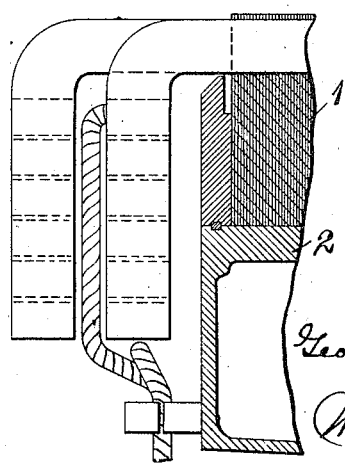

Figure 1 is an end elevation of an armature core for a dynamo-electric machine that embodies my invention, and Fig. 2 is a partial sectional elevation through the end connections and a portion of the core shown in Fig. 1.

Referring to the drawings, a magnetizable core 1 is supported by a frame 2 and is provided with a plurality of slots in its concave, cylindrical surface, in which a magnetizing winding is located, the end connections of the winding being disposed in two planes parallel to the end of the core.

The coils from the set of slots 3, 4, 5, 6, 7 and 8 are bent radially away from the center of the core and then follow curves of considerable radius into paths that are substantially concentric with the center of the core and parallel with its end surface, in a well known manner. The coils follow a plane close to the end of the core, past a series of slots 9 to 14, to a radial line *o—a* between slots 14 and 15, where they are bent into another plane further removed from the end of the core to avoid interference with the coils from slots 15 to 20 which form a group similar to the coils from slots 3 to 8 and also follow the plane nearer the end of the core to a radial line *o—b* between slots 26 and 27, where they are also bent into the outer plane. The coils from the slots 3 to 8 are connected with those from the slots 21 to 26. The coils from the slots 27 to 32 follow paths similar to those of the groups from slots 3 to 8 and 15 to 20, being bent from one plane to the other near a radial line o—c between slots 38 and 3. Thus, the end connections of each group overlap those of the next succeeding group passing around the core in one direction.

Although I have shown and described a specific arrangement applied to a single type of machine, I desire that all variations in size and form which effect similar results shall be included in the scope of my invention.

I claim as my invention:

1. A winding for dynamo-electric machines comprising a plurality of groups of coils having end connectors all portions of which, except their extremities, are substantially concentric with the machine axis and the concentric portion of each of which has a single radius of curvature, the end connectors of each group being partially under the preceding and partially over the succeeding adjacent groups.

2. A winding for dynamo-electric machines comprising a plurality of groups of coils having end connectors all portions of which, except their extremities, are substantially concentric with the machine axis and the concentric portion of each of which has a single radius of curvature, corresponding portions of the several groups being outside the adjacent groups.

3. A winding for dynamo-electric machines comprising a plurality of groups of coils having end connectors all portions of which, except their extremities, are substantially concentric with the machine axis and the concentric portion of each of which has a single radius of curvature, corresponding portions of the several groups being outside the adjacent groups and all the groups being similar in form.

4. A winding for dynamo-electric machines comprising a plurality of groups of coils having end connectors all portions of which, except their extremities, are substantially concentric with the machine axis and the concentric portion of each of which has a single radius of curvature, one portion of each group of end connectors being next to the core, the other portion overlapping the first portion of the next adjacent group and the conductors, which are connected at one end to the outer portion, being connected at the other end to the inner portion.

5. In a dynamo-electric machine, the combination with a magnetizable core provided with a plurality of slots and a magnetizing winding partially located in said slots, of a plurality of similar groups of end connectors, the main portions of which are located in parallel planes and overlap each other.

6. In a dynamo-electric machine, the combination with a frame, a slotted core and coils located in and projecting beyond said core slots into different planes, of a plurality of groups of similar end connectors, a corresponding portion of each group being outside the next adjacent group passing around the core face in one direction, and in a plane parallel to that of said adjacent group.

7. In a dynamo-electric machine, the combination with a frame, a slotted core and coils located in and projecting beyond said core slots into different planes, of a plurality of groups of similar end connectors each of which occupies two parallel planes and is partially under and partially over the respective adjacent groups.

8. In a dynamo-electric machine, the combination with a frame having a slotted core, of a plurality of groups of conductors located in and projecting beyond the ends of the core slots, and a plurality of groups of end connectors which are bent at their middle points so that they overlap and are disposed in two planes parallel to the end of the core.

9. In a dynamo-electric machine, the combination with a frame having a slotted core, of a plurality of groups of conductors located in the core slots and projecting beyond the ends thereof, said conductors having end connectors all portions of which, except their extremities, are substantially concentric with the machine axis and the middle portions of which are provided with offset bends so that the groups are disposed in planes substantially parallel to the end of the core.

10. In a dynamo-electric machine, the combination with a frame having a slotted core, of a winding having a plurality of symmetrical, overlapping groups of end connectors each of which occupies two parallel planes and comprises non-concentric curved extremities and concentric body portions each of which has a single radius of curvature.

In testimony whereof, I have hereunto subscribed my name this 12th day of June 1905.

GEO. R. MAXWELL.

Witnesses:
R. J. DEARBORN,
WESLEY G. CARR.